United States Patent [19]

Aubriot

[11] Patent Number: 4,531,288
[45] Date of Patent: Jul. 30, 1985

[54] PIPE-CUTTER WITH CUTTER WHEELS AND YOKES

[75] Inventor: Claude Aubriot, Damery, France

[73] Assignee: VIRAX, Epernay, France

[21] Appl. No.: 517,327

[22] Filed: Jul. 26, 1983

[30] Foreign Application Priority Data

Jul. 26, 1982 [FR] France ................................. 82 12979

[51] Int. Cl.³ ......................... B23D 21/08; B26D 3/16
[52] U.S. Cl. ............................................ 30/99; 30/101
[58] Field of Search ...................................... 30/93–95, 30/98, 99, 101, 102, 103, 108, 307

[56] References Cited

U.S. PATENT DOCUMENTS

| | | | |
|---|---|---|---|
| 1,699,027 | 1/1929 | Scott | 30/99 |
| 1,715,921 | 6/1929 | Himes | 30/98 |
| 2,697,875 | 12/1954 | McIver | 30/101 X |

*Primary Examiner*—Douglas D. Watts
*Attorney, Agent, or Firm*—Watson, Cole, Grindle & Watson

[57] ABSTRACT

The invention relates to an on-site pipe-cutter assembly which is intended for manual sectioning of rigid, large-diameter pipes located in narrow trenches. The pipe-cutter assembly includes two yokes (1,2) which are connected at their associated ends by tie bars (3) and nuts (4), the yokes including cutter wheels (5) and ratchet sectors (9) arranged at the periphery of the yokes (1,2), the ratchet sectors being concentric with the cutter wheels (5) and a lever (12) having with a forked end which is equipped with two pawls, the pawls making it possible to obtain changes in the angular position of the lever by 10° to 15° or by a multiple of this angle.

8 Claims, 3 Drawing Figures

FIG_1

PIPE-CUTTER WITH CUTTER WHEELS AND YOKES

BACKGROUND

The present invention relates to an on-site pipe-cutter with cutter wheels and yokes which permits rigid pipes of a large diameter to be cut manually. The known pipe-cutters of this kind are intended for cutting cast-iron pipes arranged horizontally in a trench. These are generally pipe-cutters with yokes or chain links which are first of all placed and closed around the pipe which is to be cut, and which are then moved in rotation with the cutter wheels, gradually approaching the axis of the pipe as their penetration progresses, until the separation is produced.

Pipe-cutters of a small capacity are designed to be driven by a reciprocating movement through an angle which is sufficient to produce a minimum overlapping of the impressions of the cutter wheels.

PRIOR ART

The cutting of large-diameter pipes is restricted to pipe-cutters with yokes, which are used in rotation and not in reciprocal motion. For this purpose, the yokes are provided at their periphery with fingers or orifices which are arranged regularly so as to allow the pipe-cutter to be driven in rotation by means of a lever. Such devices are described in French Patent Application published under No. 2,459,101 and in U.S. Pat. Nos. 2,300,139, 2,796,663, 3,249,998 and 3,290,779.

Whilst the trenches, at the bottom of which lie the pipes, are generally wide enough to permit the free rotation of the pipe-cutter yokes and the driving fingers which are fitted on them, this is not the case for the clearance of the lever which must allow a rotation from 45° to 60° for a pipe-cutter with yokes and 360° divided by the number of cutter wheels for a chain pipe-cutter. The torque which needs to be produced to drive the pipe-cutter and to produce the cut is very large, which makes it necessary to use a lever with a very long movement and consequently to increase the width of the trench to allow it a free clearance which depends on the angular spacing of the driving fingers or driving orifices.

There already exists a pipe-cutter with yokes and a pawl fitted with a monoblock ratchet wheel, whose angular clearance is very small. However, the embodiment of this system is fairly complicated and very bulky, which is reflected in its weight and price.

BRIEF SUMMARY OF THE INVENTION

The pipe-cutter with yokes which is the subject of the invention, which combines the system having driving orifices or fingers with that having pawls, permits these disadvantages to be eliminated. In the case of the latter, the minimum angular clearance of the driving lever is only from 10° to 15°, which allows an easier application of the maximum cutting torque as well as operation in very narrow trenches. It can moreover be used on a whole range of pipes of different diameters without being restricted to a single diameter, as is the case for the majority of pipe-cutters at the present time.

This pipe-cutter is characterized mainly in that its device for rotational driving consists of ratchet sectors arranged at the periphery of the yokes and of a lever terminating in a forked end equipped with two driving pawls.

In accordance with a particular embodiment, the ratchet sectors are arranged coaxially with each of the cutter wheels and are made of two parts arranged on either side of the plane of symmetry of the yokes. The interior of the forked end of the driving lever is provided with two pawls arranged on either side of its plane of symmetry, each comprising two teeth which are intended to cooperate with those of the ratchet sectors.

The flanks of the forked end have a cut-out which gives the lever the appearance of a fixed wrench when viewed from the side. The opening on each flank of the fixed wrench matches, on the one hand, the diameter of the bosses in which the cutter wheel axles are mounted and, on the other hand, the size across flats of the nuts for assembling and tightening the yokes. As a result, the diameter of the bosses has been chosen so as to be equal to the size across flats of a standard nut.

The assembly of the two forks is offset angularly relative to the flanks of the first tooth of the pawls so as to force the forks to engage more and more deeply on the bosses when a driving torque is applied to the lever. Correlatively, the teeth of the two pawls also mesh and engage more and more deeply in those of the ratchet sectors.

The bosses are eccentric toward the periphery of the yokes, relative to the axles of the cutter wheels, so as to endow the latter with a maximum cutting capacity.

The depth and the gap of the forked end are sufficient to permit the passage of the components of the yoke assemblies.

Other characteristics and advantages will become apparent from the following description of a pipe-cutter produced according to the invention and given by way of a non-limiting example, with reference to the attached drawings:

DETAILED DESCRIPTION

Figure 1:
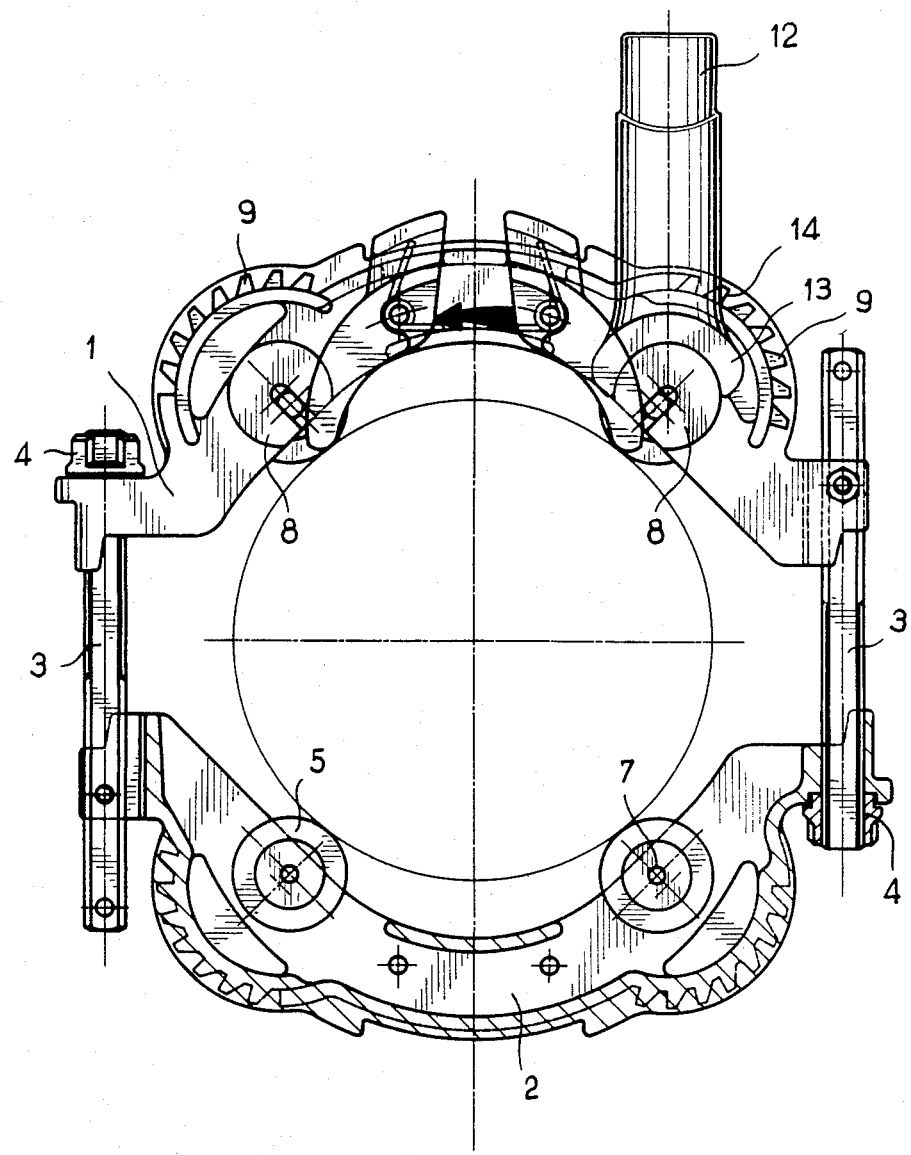
FIG. 1 shows a front view in half-section of the inventive pipe-cutter equipped with its lever.
Figure 2:
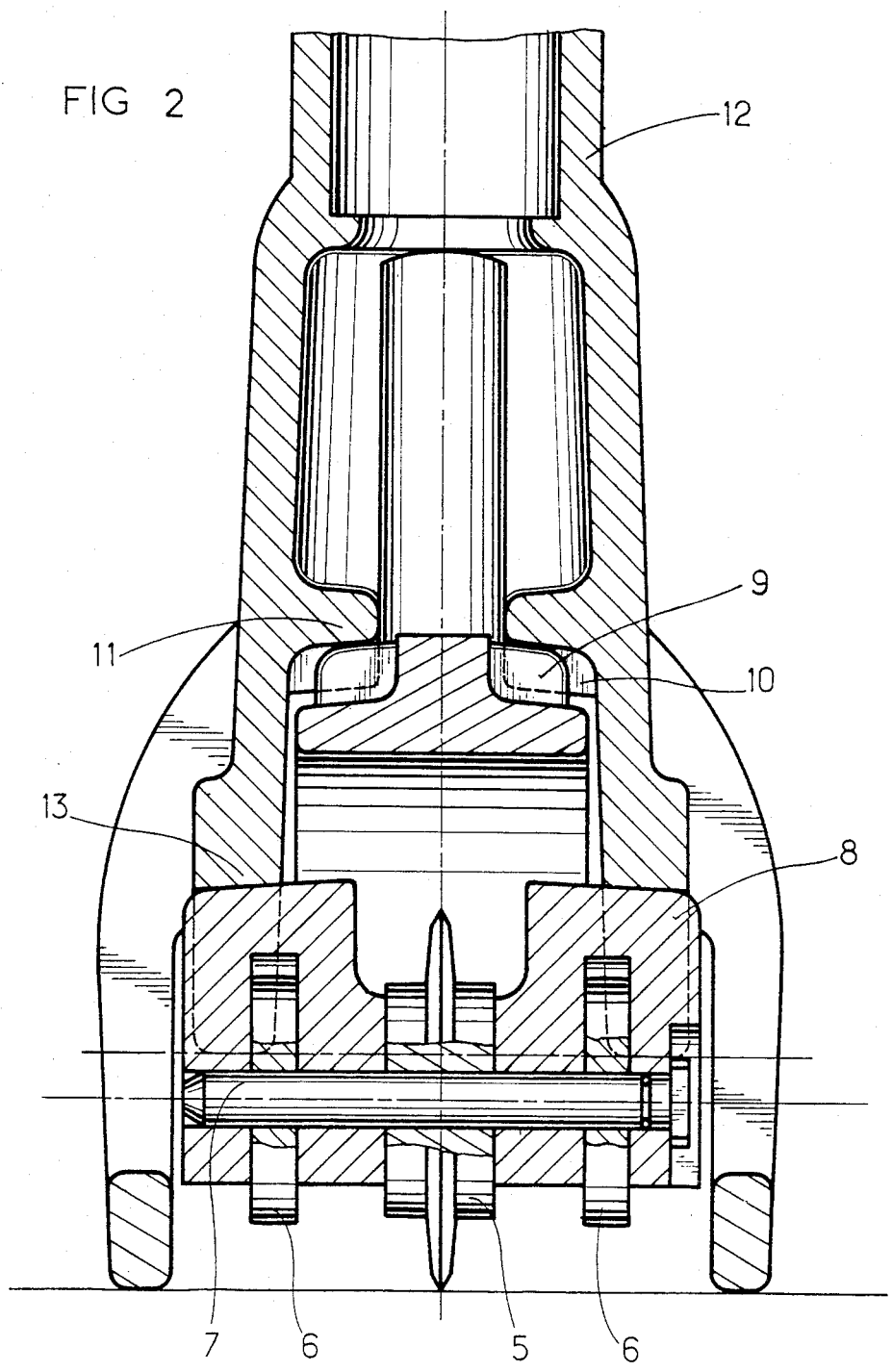
FIG. 2 shows a part view in cross-section of the device for driving the pipe-cutter in rotation.

Referring to FIGS. 1 and 2 it can be seen that the pipe-cutter consists of the yokes 1 and 2 which are held together by the tie-bars 3 and the nuts 4 and on which are mounted the cutting wheels 5 and the rollers 6 by means of axles 7 fixed in orifices pierced through the bosses 8, at the periphery of which yokes are arranged ratchet sectors 9 which are engaged by the driving pawls 10 arranged inside the forked end 11 of the lever 12. The extremity of the forked end 11 is provided with forks 13 which engage with the bosses 8.

As can be seen by referring again to FIGS. 1 and 2, the pipe-cutter is driven with the aid of the lever 12 by means of the forked end 11, pawls 10, ratchet sectors 9 and bosses 8. At the start it is sufficient to place on the bosses 8 the forks 13 situated at the extremity of the forked end 11 and to effect the engagement of the pawls 10 with two ratchet sectors 9, then to apply a force to the lever in the anticlockwise direction shown by an arrow in FIG. 1, in order to cause the pipe-cutter to be driven in rotation by meshing of the teeth of the pawls 10 with those of the two ratchet sectors 9.

On the teeth of the ratchet sectors 9, the flanks 14 against which the two pawls 10 can be supported are plane surfaces generated by radii originating from the centers of the articulation bosses 8.

Figure 3:
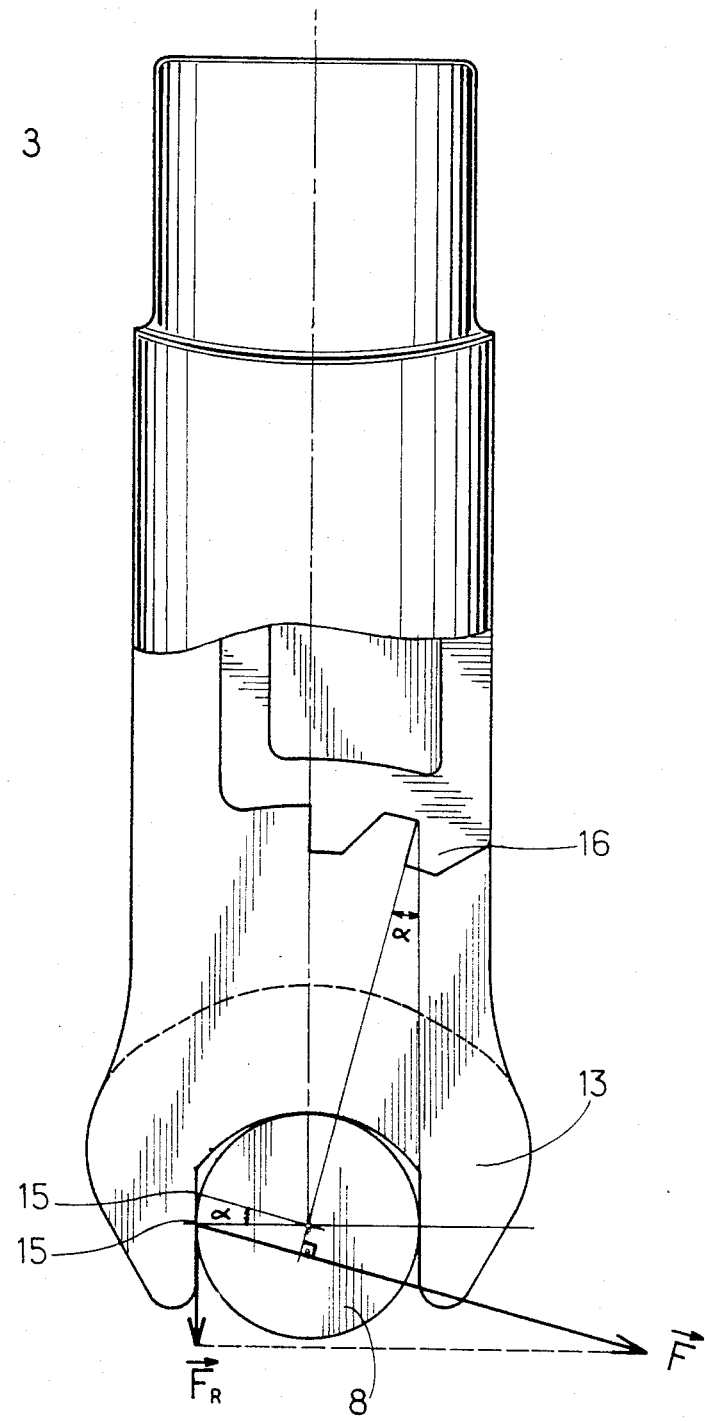
FIG. 3 is a sectional view showing the detail of one of the two forks of the lever in a driving position.

With reference to FIG. 3, it can be seen that, as a result of the angular offset α of the forks 13 relative to the flanks of the first tooth of the pawls 10, the point of contact 15 of the forks 13 with the bosses 8 is offset at 15′ through the same angle and, as the force $\overline{F}$ transmitted by the lever 12 is applied at this point 15 at right-angles to the flank of the tooth of the ratchet 9 supporting the first tooth 16 of the pawls 10, the projection of the force on the axes of the forks 13 produces a radial force $\overline{Fr}$ which ensures that the forked end 11 remains in place during the rotation of the pipe-cutter by forcing the forks 13 to engage more and more deeply on the bosses 8, whilst the teeth of the two pawls 10 also engage more and more deeply in those of the ratchet sectors 9.

The angular size of the ratchet sectors 9 and the angular separation between two successive teeth of the ratchet sectors have been determined so that the position of the driving lever can be altered by 10° to 15° whatever the position occupied by the pipe-cutter.

Between two changes of the lever position the pipe-cutter turns through an angle which depends on its position but whose mean value over one revolution is equal to the angular clearance of the lever which has a constant value chosen between 10° and 15°. As can be seen, it is possible to produce a change in the position of the lever by 10° to 15° or by a multiple of this angle over the entire periphery of the pipe-cutter.

In order to enable the forks 13 and the pawls 10 to be positioned respectively on the bosses 8 and on the ratchet sectors 9 which are placed close to the yoke-coupling nuts, the depth of the forked end 11 and its gap have been determined so as to allow the passage of the free end of the tie-bars 3.

The fact that the bosses 8 have been chosen with a diameter which is equal to the size across flats of the yoke assembly nuts enables the lever to be employed both for driving the pipe-cutter and for turning the nuts 4 from a distance.

As can be seen, this tube-cutter can be operated with changes of the lever position depending on the clearance which is permitted in each case of application. This advantage is of particular value in a deep narrow trench and in all places where access is restricted, insofar as it permits easier and more convenient application of the cutting force.

The pipe-cutter according to the invention can be employed in all cases in which a pipe has to be cut in narrow or congested locations which do not allow a large clearance of the driving lever or easy application of the cutting force. For example, it allows a pipe of nominal diameter 300 mm to be cut in a trench 600 mm wide.

Particularly attractive applications exist in civil engineering, in public works and in the plumbing of heating systems, i.e., for cutting pipes in order to construct or modify fluid distribution systems, particularly water pipework.

I claim:

1. A pipe cutter assembly which can be used to cut a pipe located in a narrow trench, said pipe cutter comprising
    two yokes which can be mounted around the pipe to be cut, each yoke having opposite ends, an inner side and an outer side, each yoke including two rotatable cutter wheels which have a cutting edge that protrudes from the inner side of the associated yoke; two curved ratchet sectors which are respectively located near the opposite ends of the associated yoke, each curved ratchet sector including a plurality of spaced apart teeth which extend away from the outer side of the associated yoke, each curved ratchet sector defining an imaginary center axis; and two bosses, each boss being positioned such that the center axis of a respective curved ratchet sector passes therethrough;
    each of said wheels defining an imaginary center axis, and wherein each cutter wheel is mounted on the respective yoke such that its imaginary center axis is coincident with the imaginary center axis of a respective curved ratchet sector;
    two coupling means for interconnecting the associated ends of said two yokes, each of said coupling means including a yoke coupling nut; and
    a lever for rotating said two yokes when coupled by said interconnecting coupling means around a pipe to be cut, said lever including two spaced apart arms, at least one arm including a drive catch which extends towards the other arm and each arm including a forked operating end, each drive catch being abutable against a tooth of a curved ratchet sector when the forked operating ends of said arms are positioned around the periphery of the associated boss.

2. The pipe cutter assembly as defined in claim 1, wherein each boss includes two boss parts, and wherein each cutter wheel is located between two boss parts.

3. The pipe cutter assembly as defined in claim 1, wherein each boss part defines an imaginary center axis which is coincident with the associated center axis of the associated curved ratchet sector.

4. The pipe cutter assembly as defined in claim 1, wherein each coupling nut includes flat surfaces at its periphery, and wherein the forked operating end of said lever is dimensioned to engage with the flat surfaces of each coupling nut.

5. The pipe cutter assembly as defined in claim 1, wherein the arms of said lever are spaced apart sufficiently to allow said coupling nuts to fit therebetween.

6. The pipe cutter assembly as defined in claim 1, wherein each arm of said lever includes a drive catch extending toward the other arm.

7. The pipe cutter assembly as defined in claim 6, wherein each of the teeth of each curved ratchet sector includes a flat flank surface against which the drive catches on the arms of said lever will abut, the plane formed by each of said flat flank surfaces extending through the imaginary center axis of the associated curved ratchet sector.

8. The pipe cutter assembly as defined in claim 7, wherein the lever is constructed such that, as the forked operating ends of the arms thereof engage more and more deeply on the bosses, the drive catches thereof will engage more and more the flank surfaces of the teeth of the associated curved ratchet sector.

* * * * *